May 15, 1934.  H. N. RIDGWAY  1,959,038

PROJECTOR WITH REMOTE CONTROL

Filed March 8, 1933   2 Sheets-Sheet 1

Inventor.
Herbert N. Ridgway
by Heard Smith & Tennant
Attys.

May 15, 1934. H. N. RIDGWAY 1,959,038
PROJECTOR WITH REMOTE CONTROL
Filed March 8, 1933 2 Sheets-Sheet 2
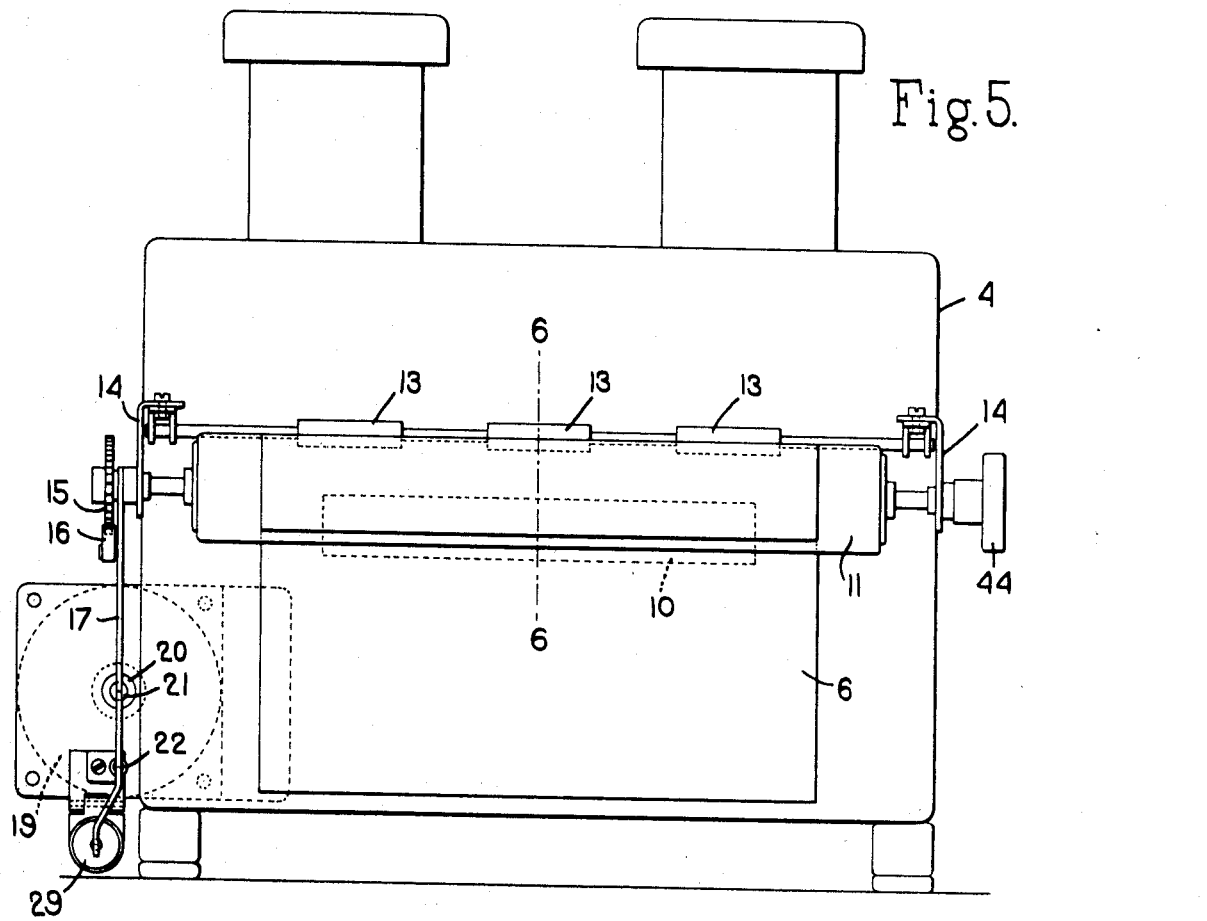
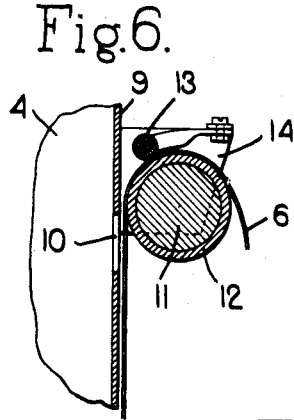
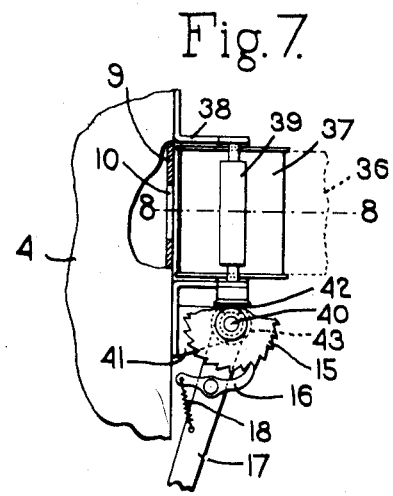
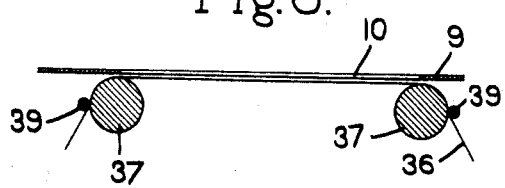
Inventor.
Herbert N. Ridgway
by Heard Smith & Tennant
Attys.

Patented May 15, 1934

1,959,038

UNITED STATES PATENT OFFICE 1,959,038

PROJECTOR WITH REMOTE CONTROL

Herbert N. Ridgway, Winthrop, Mass.

Application March 8, 1933, Serial No. 660,024

4 Claims. (Cl. 88—24)

This invention relates to projectors and particularly to projectors which are provided with a remote control so that the operator may change the image projected by the projector from a point at a distance from the projector.

While the invention is capable of general use as a projector yet it has been specially designed for the use of a person who is posing for a moving talking picture to throw on a screen which is out of the field of the camera but is visible to the person being filmed, the talk, remarks, or speech which such person is to make whlie being filmed. In this way such person may read his speech or remarks from the screen thus avoiding the possibility of forgetting just what he planned to say. The projector is arranged to throw on the screen a portion only of the complete remarks or speech and the remote control feature enables the person being filmed to operate the projector to change the image on the screen as the delivery of the speech or remarks proceeds so that there will always appear on the screen the portion of the remarks or speech being delivered.

In order to give an understanding of the invention I have illustrated in the drawings some selected embodiments thereof which will now be described after which the novel features will be pointed out in the appended claims.

Fig. 5 is a rear view of the projector;

Fig. 6 is a section on the line 6—6, Fig. 5;

Fig. 7 is a fragmentary sectional view showing a different embodiment of the invention;

Fig. 8 is a fragmentary sectional and somewhat diagrammatic view taken generally on the line 8—8, Fig. 7.

Figure 1:
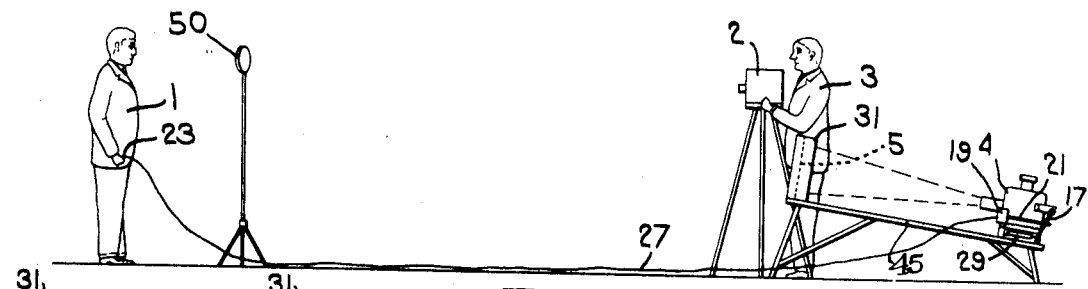
Fig. 1 is a view illustrating a projector embodying my invention and showing its manner of use.

Fig. 1 shows in general one way in which the projector may be used and in said figure 1 indicates the figure of a person who is posing for a moving talking picture and 2 illustrates diagrammatically the camera or other apparatus by which the moving talking picture is made, 3 being the operator for the camera and 50 indicating the microphone.

The projector embodying my invention is indicated generally at 4 and it is arranged to throw on a screen, which is situated outside of the field of the camera 2 but where the person 1 can readily see it, and preferably relatively close to the camera 2, the remarks or speech which the person 1 being filmed is to make while he is being filmed.

The screen is shown at 5 and it may conveniently be supported in a suitable frame. The projector 4 is arranged to project on the screen 5 at any one time a portion only of such remarks or talk. The projector is operated from time to time to change the reading on the screen as the delivery of the remarks proceeds and the present invention provides a novel remote control apparatus by which the operator 1 can actuate the projector 2 to thus change the reading on the screen.

Figure 4:
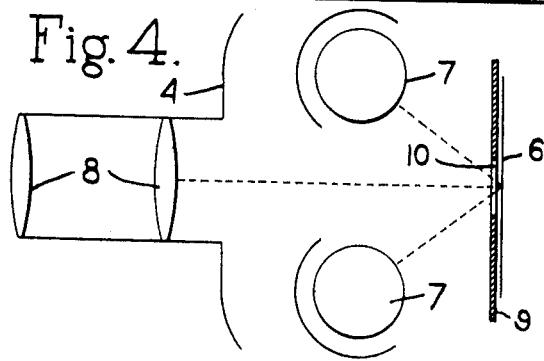
Fig. 4 is a diagrammatic view showing the manner in which the image of the typewritten or written speech is projected.

While any suitable type of projector may be employed yet I prefer one in which the image produced on the screen is a reflection from a sheet of paper on which the remarks or speech may be typewritten or written in manuscript. Fig. 4 shows more or less diagrammatically such a projector and in said figure 6 represents a sheet of paper on which the speech or talk may be typewritten or written in manuscript and 7 indicates lamps or other sources of illumination which throw a bright light on the sheet 6. The image of the lighted surface 6 is projected through the lenses 8 to form an enlarged image on the screen.

The sheet 6 of paper having the remarks or speech typed or written thereon is situated close to the back wall 9 of the projector 4, said wall having a sight opening 10 therein through which a portion of the sheet 6 is visible, this being the portion which is brightly illuminated by the lamps 7, and it is the reflection of the portion of the strip or sheet 6 that is visible through the sight opening 10 which is projected on the screen.

Suitable feeding means are provided for intermittently feeding the sheet or strip 6 past the opening 10. As herein shown there is provided a feed roll 11 which is preferably made with a rubber exterior as shown at 12 and around which the sheet 6 passes. 13 indicates a presser roll which is preferably spring pressed and which yieldingly holds the sheet against the feed roll 11.

Means are provided for intermittently rotating the feed roll 11 thereby to bring successive portions of the sheet or strip 6 in line with the sight opening 10. The feed roll 11 is shown as carried in brackets 14 secured to the projector 4 and said feed roll has fast thereon a ratchet wheel 15 with which co-operates a feed pawl 16 carried by a swinging lever 17 which is pivotally mounted on the shaft of the roll 15. This pawl 16 is acted on by a spring 18 which yieldingly holds it in engagement with the ratchet 15. A swinging movement of the lever 17 to the right Fig. 2 will turn the roll 11 anti-clockwise thereby feeding the strip or sheet 6 downwardly past the sight opening 10.

There is provided means under the control of the party 1 being filmed for actuating the lever 17 so that the reading which is exhibited on the screen may be changed as the delivery of the speech or talk proceeds. The device herein shown for actuating the lever arm 17 is a solenoid 19, the core 20 of which is connected to the lever arm 17 through a link member 21. When the solenoid 19 is energized the link 21 is moved to the right Fig. 2 thereby swinging the arm 17 from the full to the dotted line position and this will operate to feed the strip or sheet 6 forward.

22 indicates a return spring connected to the arm 17 and which returns it to the full line position when the solenoid is de-energized.

The solenoid may be energized at the desired periods of time through a switch adapted to be actuated by the party 1. Such a switch is indicated at 23 and may conveniently be of the type that a party can hold in his hand and which contains a suitable push button 24 by which the solenoid circuit is closed. The switch 23 is shown as connected to the solenoid through circuit wires 25 that are supplied with energy from a battery 26 or other suitable source of electricity. The circuit wires 25 can conveniently be embodied in a cable 27 which extends from the solenoid 19 of the projector 4 to the switch 23.

The strip or sheet feeding device herein illustrated is adapted to feed either individual sheets or to feed a long strip. If individual sheets are used on which the speech or talk is written, one end of the sheet may be inserted between the feed roller 11 and the presser roll 13 and directed downwardly sufficiently past the sight opening 10 so that the first few lines of the written matter are in a position to be illuminated through the sight opening. The matter which is written on such portion of the sheet 6 will be projected on the screen 5 as shown at 28 in Fig. 3.

Figure 3:
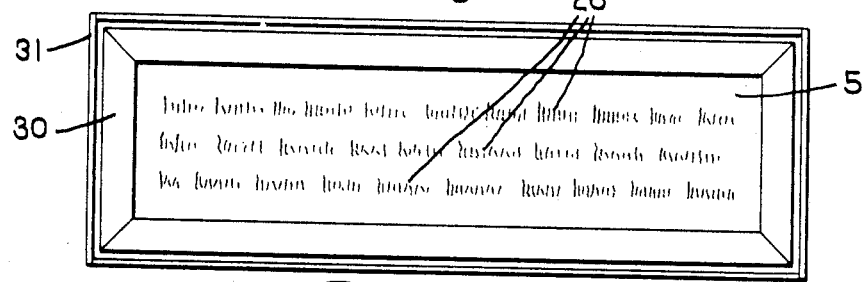
Fig. 3 is a front view of the screen with the image thereon.

The sight opening 10 may conveniently be of a size so that two, three or four lines of typewritten matter are visible through said opening at one time and this will result in two, three or four lines of the typewritten matter being projected on the screen 5. In Fig. 3 three such lines are shown as being projected.

The party 1 being filmed reads from the screen 5 while the filming proceeds and as he reads he periodically operates the switch 23 so as to intermittently advance the sheet 6 thereby bringing into view on the screen 5 a projection of the typewritten matter as fast as required. In this way the party 1 is relieved of the nervous tension to which many people are subjected when they are trying to deliver from memory a prepared speech or remarks.

With this invention the prepared speech or prepared remarks may be thrown on the screen 5 so that the party 1 can easily read what appears on the screen 5, and as the speed at which the image on the screen 5 changes is under the control of the party 1 he can easily regulate such speed of feeding movement to the rate at which the speech or remarks is being delivered.

29 indicates a dash pot, the piston of which is connected to the lever arm 17, the purpose of this being to retard the motion of the arm due to the impulse of the solenoid so as to give a more even feeding movement.

In order that the image on the screen may be easily read in the daylight I have provided a novel holder for the screen 5 which shades the latter more or less so as to make the image more plainly visible. The screen 5 is carried in a frame 30 which is provided on both sides with a hood portion or shadow box 31 that extends both forwardly and backwardly from the frame. In this way the screen is partly shaded so that the projection on it shows up plainly even in ordinary daylight.

In the construction shown in Figs. 1 to 6 the sheet of paper is fed downwardly over a horizontal feed roll. Instead of individual sheets of paper it may be desirable sometimes to use a long strip of paper such as shown in dotted lines at 32 in Fig. 2. Such strip of paper may be taken from a roll 33 and after passing over the feed roll 11 may be wound on a spring-actuated take-up roll 34, both of which rolls are shown as mounted in a suitable bracket 35.

Instead of feeding the sheet or strip downwardly over a horizontal feed roll as shown in Fig. 6 the strip bearing the matter to be projected on the screen may be fed horizontally around vertically-arranged rolls as shown in Figs. 7 and 8. In this embodiment of the invention the strip is indicated at 36 and it passes around two vertically-arranged feed rolls 37, each of which is mounted in a suitable bracket 38. Each roll 37 has a spring-pressed roll 39 co-operating therewith to yieldingly hold the strip 36 against the feed roll. In this embodiment the strip 36 will be fed horizontally lengthwise of the opening 10.

Figure 2:
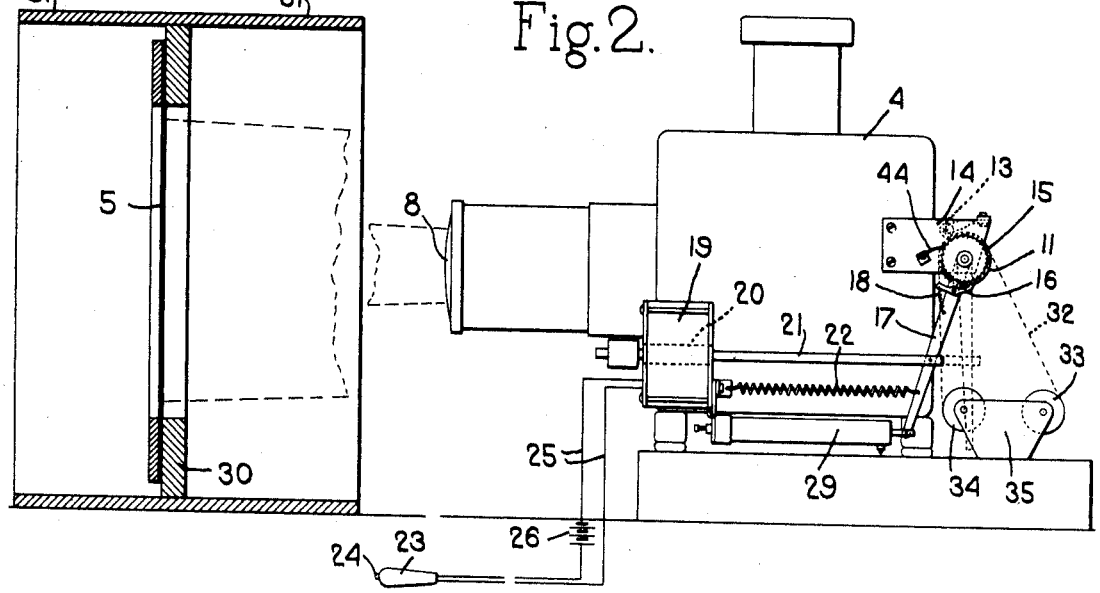
Fig. 2 is an enlarged view broken out showing the projector and also showing the screen in section.

For operating the feed rolls 37 I have provided a shaft 40 which is journalled in suitable brackets 41 secured to the projector 4 and which is provided with a ratchet 15 similar to that shown in Fig. 2. Said ratchet co-operates with the feed pawl 16 carried by the actuating arm 17. The shaft of each feed roll is provided on its lower end with a bevelled gear 42 adapted to mesh with a corresponding bevelled gear 43 fast on the shaft 40 so that by rotating the shaft 40 the feed rolls 37 will be turned thereby feeding the strip longitudinally across the sight opening 10.

44 indicates a hand wheel on the shaft of the feed roll 11 by which said feed roll can be manually turned as occasion demands. The frame 31 for the screen 5 and the projector 4 are shown as mounted on a suitable stand or support 45. With this construction the projector and the stand constitute a unitary structure which can be moved about as a unit and placed in any desired position.

I claim:

1. A projection apparatus comprising a projector provided with a casing having an illuminated opening in its rear wall, a feed roll for supporting outside of the casing and in the rear of said opening an individual sheet of paper carrying on its surface which faces the opening written or printed matter in lines extending longitudinally of the opening, a presser roll for holding the sheet of paper against the feed roll, means situated within the casing and in front of said sheet to illuminate the portion of the front face thereof which is exposed through said opening, means to project the image of the illuminated portion of said front face on a screen, means to rotate the feed roll intermittently, and means at a distance from the projector to control the operation of the feed roll.

2. A prompting projection apparatus for a person posing before a camera taking talking moving pictures, said projection apparatus comprising a stand situated out of the field of said camera, a screen supported thereby, a projection device also mounted on said stand, said projection device having a casing provided with an opening in its rear wall, means outside of the casing for supporting in the rear of the opening an individual sheet of paper having the message to be delivered by the person posing written on its surface which faces the opening, means within the casing to illuminate the portion of the sheet which is exposed through the opening, means to project an image of the illuminated portion of said sheet onto said screen, and means under the control of the person posing to feed the sheet forward intermittently.

3. A prompting projection device for a person posing before a camera taking talking moving pictures comprising a stand or support situated out of the field of said camera, a screen carried by the stand on the side thereof adjacent the person posing, a projecting apparatus comprising a casing having an opening in its rear wall, a feed roll situated outside of the casing above said opening and adapted to support an individual sheet of paper having written or printed thereon the message to be delivered by the person posing with the surface of the paper bearing said message facing the opening, means within the casing to illuminate the portion of the message-bearing face of the paper which is exposed through the opening, means between the sheet and the screen to project an image of the illuminated portion onto the screen, and means under the control of the person posing to actuate the feed roll intermittently.

4. A prompting projection device for a person posing before a camera taking talking moving pictures comprising a stand or support situated out of the field of said camera, a screen carried by the stand on the side thereof adjacent the person posing, a hood for the screen on the side thereof adjacent said person, a projecting apparatus comprising a casing having an opening in its rear wall, a feed roll situated outside of the casing above said opening and adapted to support an individual sheet of paper having written or printed thereon the message to be delivered by the person posing with the surface of the paper bearing said message facing the opening, means within the casing to illuminate the portion of the message-bearing face of the paper which is exposed through the opening, means between the sheet and the screen to project an image of the illuminated portion onto the screen, and means under the control of the person posing to actuate the feed roll intermittently.

HERBERT N. RIDGWAY.